United States Patent
Porzio et al.

(10) Patent No.: US 11,228,225 B2
(45) Date of Patent: Jan. 18, 2022

(54) ELECTRIC MOTOR ASSEMBLY FOR RAILWAY DRIVE

(71) Applicant: HITACHI RAIL S.p.A., Naples (IT)

(72) Inventors: Mario Porzio, Naples (IT); Ciro Maiello, Caserta (IT); Simone Sinatti, Quarrata (IT)

(73) Assignee: HITACHI RAIL S.P.A., Naples (IT)

( * ) Notice: Subject to any disclaimer, the term of this patent is extended or adjusted under 35 U.S.C. 154(b) by 701 days.

(21) Appl. No.: 16/046,417

(22) Filed: Jul. 26, 2018

(65) Prior Publication Data
US 2019/0036417 A1    Jan. 31, 2019

(30) Foreign Application Priority Data
Jul. 28, 2017 (IT) ................... 102017000087339

(51) Int. Cl.
| | |
|---|---|
| *H02K 5/24* | (2006.01) |
| *B61C 3/00* | (2006.01) |
| *H02K 9/06* | (2006.01) |
| *H02K 5/20* | (2006.01) |
| *H02K 11/33* | (2016.01) |

(52) U.S. Cl.
CPC ............... *H02K 5/24* (2013.01); *B61C 3/00* (2013.01); *H02K 5/20* (2013.01); *H02K 9/06* (2013.01); *H02K 11/33* (2016.01); *H02K 2205/09* (2013.01)

(58) Field of Classification Search
CPC ... B61C 3/00; H02K 5/20; H02K 5/24; H02K 9/06; H02K 9/20; H02K 9/24; H02K 11/33; H02K 2205/09
USPC ................... 310/51, 52, 53, 54, 64
See application file for complete search history.

(56) References Cited

U.S. PATENT DOCUMENTS

| | | | |
|---|---|---|---|
| 4,441,690 A * | 4/1984 | Koopmans | B66C 13/52 254/279 |
| 10,393,123 B2 * | 8/2019 | Gundel | F04D 29/282 |
| 2011/0100253 A1 * | 5/2011 | Koyama | F04D 25/105 105/34.1 |
| 2016/0285339 A1 * | 9/2016 | Smith | H02K 11/30 |

(Continued)

FOREIGN PATENT DOCUMENTS

| | | |
|---|---|---|
| CH | 495 651 | 8/1970 |
| GB | 149411 | 8/1920 |

(Continued)

*Primary Examiner* — Tulsidas G Patel
*Assistant Examiner* — Rashad H Johnson
(74) *Attorney, Agent, or Firm* — Leason Ellis LLP

(57) ABSTRACT

An electric motor assembly for railway drive. The motor assembly comprises:
- an electric drive motor;
- a ventilation and cooling device for ventilating and cooling the electric drive motor through cooling air; and
- a draining device to drain the ventilation and cooling air flow.

The draining device is provided with a silencer device for the cooling air flow. The silencer device comprise at least one straight channel to reduce the turbulent flow into a substantially laminar flow of the out-flowing ventilation and cooling air. Furthermore, the draining device comprises a scroll, which consists of two separate arched channels in order to avoid the formation of stationary vortices. The two arched channels communicate with one another, from the fluidic point of view, only in a common outlet area for the ventilation and cooling air.

10 Claims, 6 Drawing Sheets

(56) References Cited

U.S. PATENT DOCUMENTS

2019/0356187 A1* 11/2019 Frohlich .................. H02K 9/06
2020/0240433 A1*  7/2020 Hoyt ....................... F24F 13/24

FOREIGN PATENT DOCUMENTS

| | | |
|---|---|---|
| JP | S5337004 | 4/1978 |
| JP | 2002 233104 | 8/2002 |
| JP | 2005 312242 | 11/2005 |
| TW | 201 138 274 | 11/2011 |
| WO | WO 97/37421 | 10/1997 |

* cited by examiner

ELECTRIC MOTOR ASSEMBLY FOR RAILWAY DRIVE

CROSS-REFERENCE TO RELATED APPLICATIONS

This application claims priority from Italian Patent Application No. 102017000087339 filed on Jul. 28, 2017, the disclosure of which is incorporated by reference.

TECHNICAL FIELD

The invention relates to an electric motor assembly for railway drive.

BACKGROUND OF THE INVENTION

As it is known, environmental standards establish limits that are becoming stricter and stricter in terms of train sound emissions.

A significant source of these sound emissions is the electric drive motor, in particular the motor having a so-called "self-ventilated" ventilation system.

In the self-ventilated ventilation system, the motor cooling flow is generated by a fan, which is directly fitted onto the shaft of the motor.

Furthermore, it is known that in recent year there has been a shift from "locomotive-drive" systems, in which the sole locomotive at the head of the train was responsible for driving itself and the other wagons, to railway drive means, in which each carriage is self-moving and, therefore, is provided with autonomous moving means.

Therefore, this has led to a significant increase in the number of drive systems of each train.

According to noise measurements carried out according to the standards currently enforced, along the shafts of the motor the emission is greater than the one generated by the cooling fan.

The problem of noise damping in electric motors has been taken into account in the following documents:
JP-A-2002 233104
JP-A-2005 312242
WO-A1-97/37421
CH-A-495 651 each of which illustrates, if taken individually, the preamble portion of claim 1.

Hence, there is the need to find a simple and effective system to reduce the noise of electric drive motors used in the railway field.

SUMMARY OF THE INVENTION

Therefore, the object of the invention is to provide an electric motor assembly, in particular for railway drive, which is not affected by the above-mentioned drawbacks.

As a consequence, according to the invention, there is provided an electric motor assembly, in particular for railway drive, according to claim 1 or to any one of the Claims that directly or indirectly depend on claim 1.

BRIEF DESCRIPTION OF THE DRAWINGS

The invention will be best understood upon perusal of the following description of a preferred embodiment, provided by way of a mere explanatory, non-limiting example, with reference to the accompanying drawings, wherein.

DETAILED DESCRIPTION OF THE INVENTION

Figure 1:
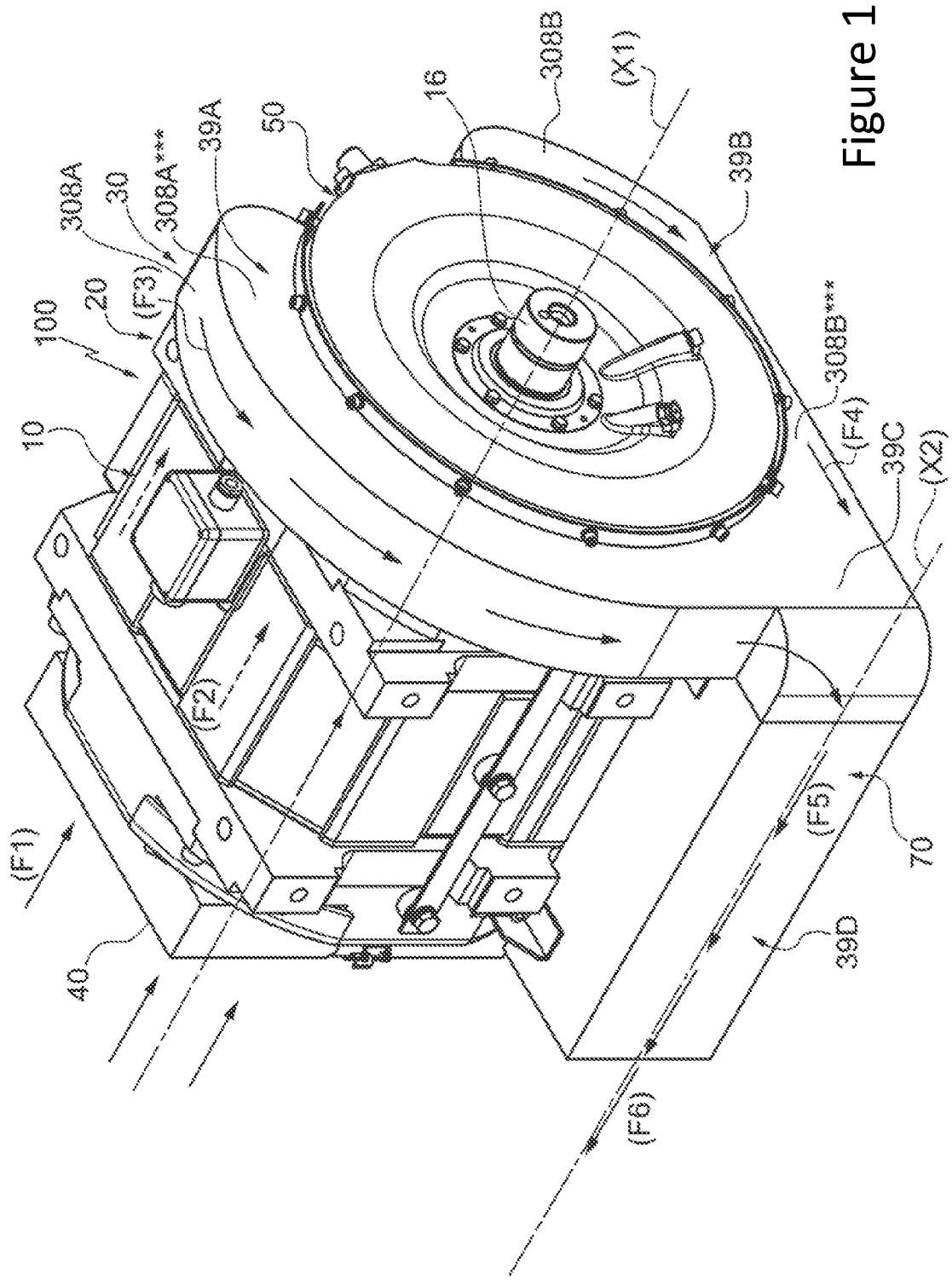
FIG. 1 shows an overall perspective view of an electric motor assembly for railway drive according to the invention.

In FIGS. 1-4, number 100 indicates, as a whole, an electric drive motor assembly according to the technical teaches of the invention.

The electric drive motor assembly 100 substantially comprises:
- an electric drive motor 10 (FIGS. 2, 3);
- a ventilation and cooling device 20 (FIG. 2) for ventilating and cooling the electric drive motor 10 through cooling air; and
- a draining device 30 to drain the ventilation and cooling air flow of the electric drive motor 10.

More in detail and with reference to FIGS. 1-4, the electric drive motor 10 comprises, in a known manner, a casing 11, substantially with a polyhedral shape, containing the greatest part of the functional devices of the electric drive motor 10.

Figure 3:
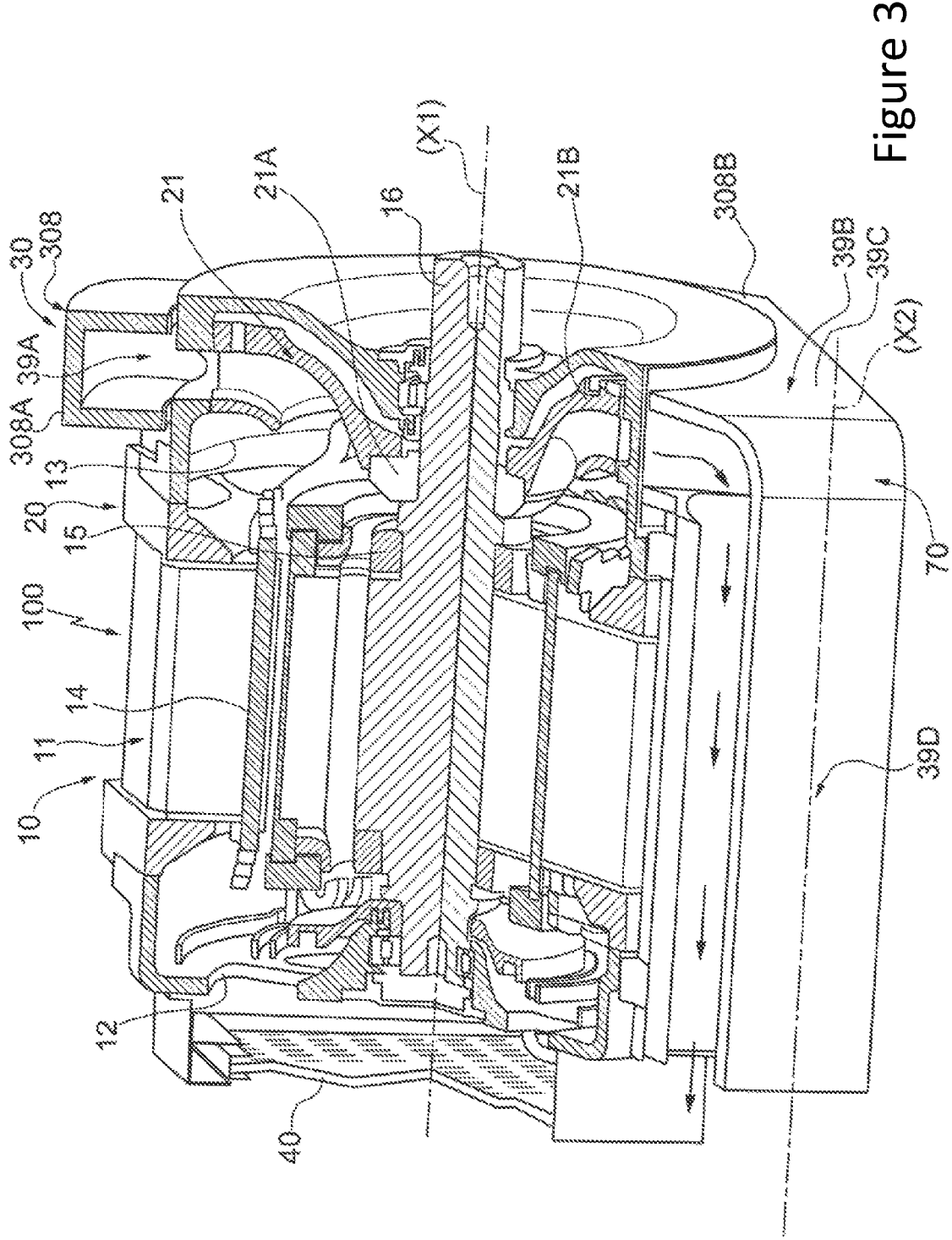
FIG. 3 shows a longitudinal section of the electric motor assembly of FIG. 1.

The casing 11 has a first axial opening 12 provided with an inlet grid 40 for a cooling air flow coming from the environment (FIG. 3).

The casing 11 is further provided with a second axial opening 13 for the outlet of the cooling air flow and for the re-directing thereof towards the aforesaid ventilation and cooling device 20 and the aforesaid draining device 30 (FIG. 3).

As shown more in detail in FIG. 3, the casing 11 houses an electric stator 14 containing, in turn, an electric rotor 15, which is fitted in a known manner onto a shaft 16 with longitudinal axis (X1).

With known means, which are not shown herein, the shaft 16 is mechanically connected to a drive system (not shown) of the train.

The power supply means of the electric stator 14 and of the electric rotor 15 are known and, therefore, will not be described in detail.

Figure 2:
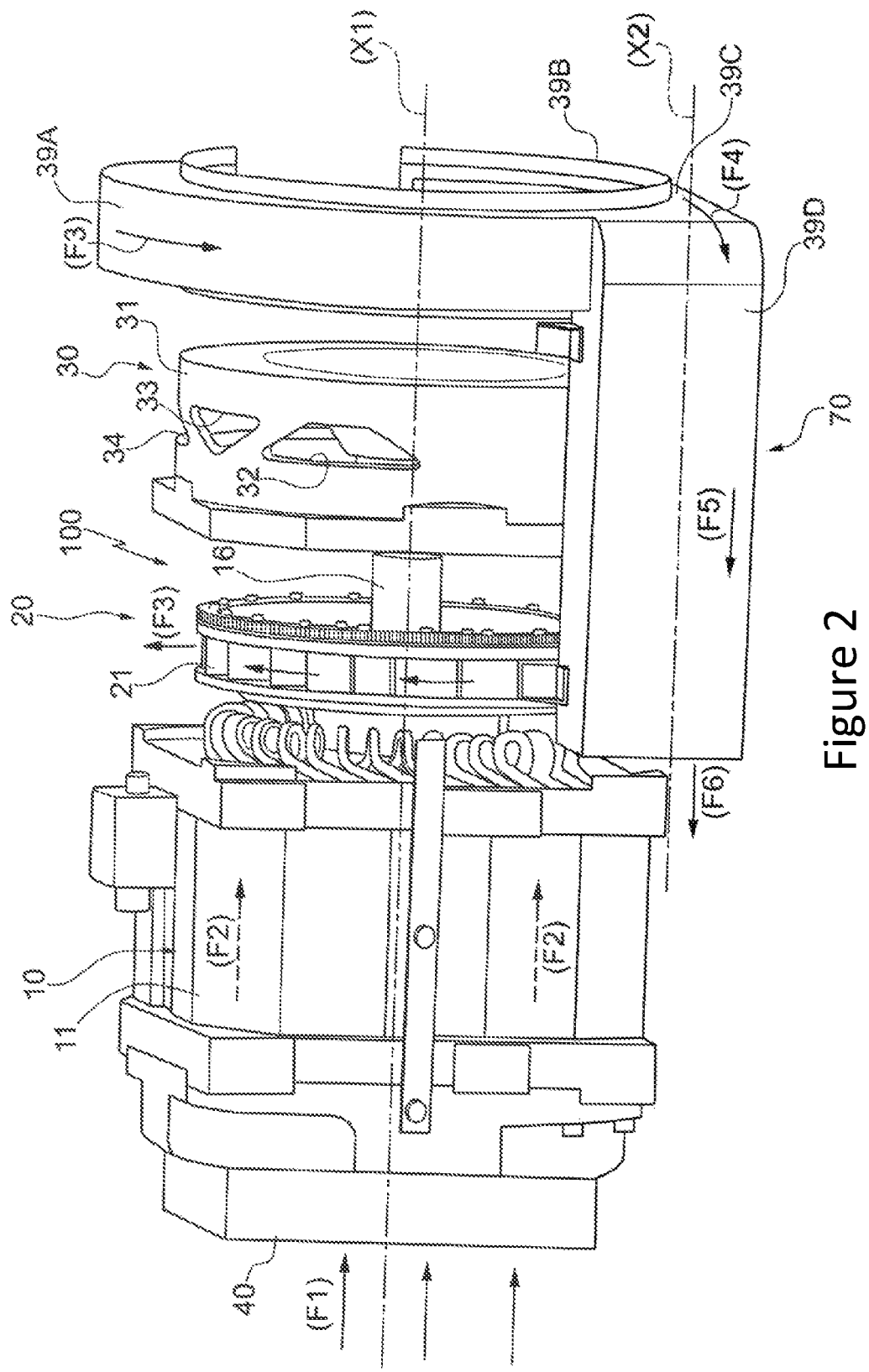
FIG. 2 shows an exploded view of the electric motor assembly shown in FIG. 1.

According to FIG. 2, the fan 21, which belongs to the aforesaid ventilation and cooling device 20, is fitted onto the shaft 16.

Figure 4:
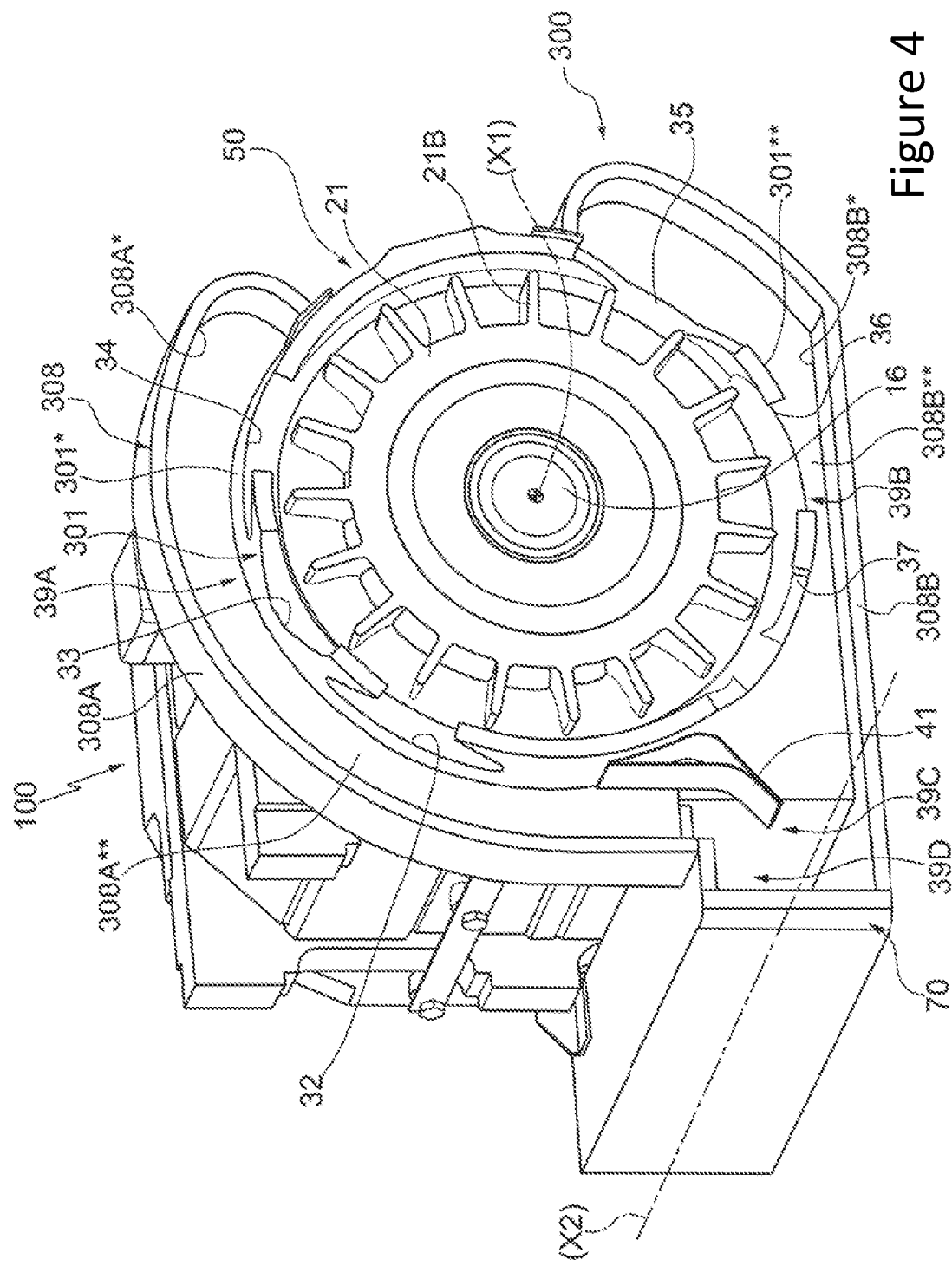
FIG. 4 shows a cross section of the electric motor assembly of FIG. 1.

The fan 21 is known and is shown more in detail in FIG. 4.

The fan 21 comprises a hub 21A, which is fitted onto the shaft 16; the hub 21A being provided with blades 21B (FIG. 3).

For a person skilled in the art it is obvious that, without going beyond the scope of protection of the invention, it is possible to adopt blades having different shapes, provided that they are suited to effectively carry out the suction of environmental air in order to cool down the electric motor 10.

Indeed, the suction of cooling air must take place in an effective manner for both directions of rotation of the rotor 15 and, hence, of the fan 21.

It is known, indeed, that in railway drive the same electric motor assembly 100 is used for both the forward and the reverse running of the vehicle on which it is mounted. This leads to the fact that, as a consequence, the rotor 15 and the fan 21 must have the chance to rotate around the longitudinal axis (X1) in the two possible rotation directions (forward and reverse running).

Furthermore, there must be an optimal cooling air suction both when the electric motor 10 is accelerating (for example, with the fan 21 rotating in a clockwise direction) and when the electric motor 10 is decelerating (for example, with the fan 21 rotating in a counterclockwise direction).

The draining device 30 used to drain the cooling air comprises a scroll 300 (FIG. 4), which surrounds the fan 21 and consists of an inner shell 301, which is provided with a first series of upper openings 32, 33, 34 (FIG. 4) and a second series of lower openings 35, 36, 37.

Advantageously, though not necessarily, the outer openings 32, 34 have a trapezoidal shape, whereas the middle opening 33 is shaped like a triangle (FIGS. 2, 4).

Similarly, advantageously, though not necessarily, the outer openings 35, 37 have a trapezoidal shape, whereas the middle opening 36 is shaped like a triangle (FIGS. 2, 4).

Obviously, the skilled person will advantageously choose the best conformation of the openings 32-37 depending on the shape of the blades 21B and on the cooling air ventilation modes.

According to FIGS. 1 and 4, in particular, the inner shell 301 is contained in an outer shell 308.

The outer shell 308 comprises, in turn, an upper half-shell 308A, which faces the upper openings 32-34 made in the inner shell 301, and a lower half-shell 308B, which faces the lower openings 35-37 made in the inner shell 301.

It should be pointed out (FIG. 4) that the outer wall 301\* of a first portion of the inner shell 301, the inner wall 308A\* of the upper half-shell 308A, a bottom wall 308A\*\* and a front wall 308A\*\*\* (FIG. 1) form a first arched channel 39A (with the shape of a circle arc).

Similarly, the outer wall 301\*\* of a second portion of the inner shell 301, the inner wall 308B\* of the lower half-shell 308B, a bottom wall 308B\*\* and a front wall 308B\*\*\* (FIG. 1) form a second arched channel 39B (i.e. with the shape of a circle arc, as well).

The assembly of the first arched channel 39A and of the second arched channel 39B forms the aforementioned scroll 300.

Furthermore, the first arched channel 39A and the second arched channel 39B communicate with one another, from the fluidic point of view, only in a common outlet area 39C for the cooling air.

The first arched channel 39A is separate from the second arched channel 39B by means of an interruption area 50 (FIGS. 1, 4), so as to avoid that at least a portion of the air is continuously recirculated in a substantially stationary manner in the two arched channels 39A, 39B having similar dimensions and sizes. In other words, the presence of the interruption area 50 and, hence, of two distinct arched channels 39A, 39B forbids the formation of stationary vortices inside the scroll 300, which would translate into an undesired loss of power of the system.

Furthermore, it is well known that the formation of stationary vortices could increase the noise of the system.

Moreover, since, as already mentioned above, the scroll 300 is divided into two arched channels 39A, 39B, which communicate with one another, from the fluidic point of view, only in a common outlet area 39C, the fan 21 operates in a satisfying manner in both its possible rotation directions (clockwise and counterclockwise) around the longitudinal axis (X1), furthermore avoiding losses of power due to the possible formation of stationary vortices in the scroll 300.

The common outlet area 39C is advantageously provided with a deflector 41, which separately guides the two air flows and, for example, prevents the air flowing out of the first arched channel 39A from inappropriately flowing into the second arched channel 39B or vice versa.

In other words, each arched channel 39A, 39B substantially has a respective circle arc shape and is arranged peripherally relative to the aforesaid longitudinal axis (X1).

The common outlet 39C represents the mouth of a third straight channel 39D, advantageously, though not necessarily, with a square or rectangular cross section, having a longitudinal axis (X2) parallel to the longitudinal axis (X1) of the shaft 16 and of the motor 10 (FIGS. 1-4).

Since the common outlet 39C also represents the mouth of the third straight channel 39D, the scroll 300 and the third straight channel 39D are placed in series with respect to each other.

Advantageously, though not necessarily, the third straight channel 39D is beside the electric drive motor 10.

Hence, all the cooling air, both in a rotation direction of the blades 21B and in the other one, axially flows along the third straight channel 39D before flowing out of the system and being reintroduced into the environment.

To sum up, experiments have shown that, if in the end part of its path, the cooling air has a substantially laminar flow (anyway reducing the turbulent flow), there is a significant reduction in the sound emissions of the system.

The path of the cooling air is schematically shown in FIG. 1.

The environmental air (arrow (F1)) enters the system through the grid 40 (FIG. 3) sucked by the fan 21. The cooling air crosses the actuator 14 and the rotor 15 of the electric motor 10 (arrow (F2)), then flows through the two peripheral arched channels 39A, 39B, where it flows towards the common outlet 39C (arrows (F3), (F4)).

In the area of the common outlet 39C the cooling air gets into the straight channel 39D (arrow (F5)), in order to then be reintroduced into the environment (arrow (F6)).

Figure 5:
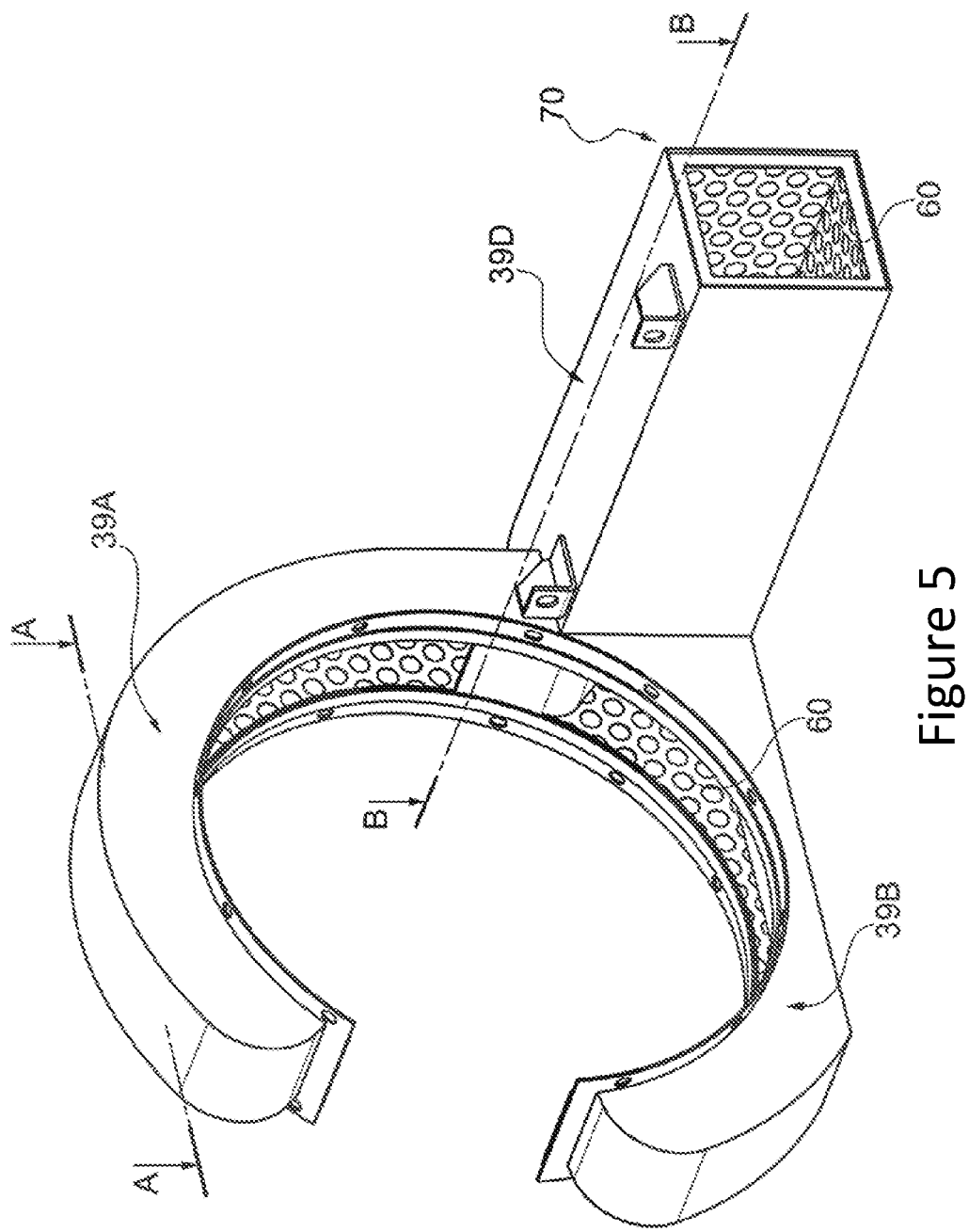
FIG. 5 shows a perspective view of a silencer device belonging to the electric drive motor assembly shown in FIGS. 1-4.
Figure 7:
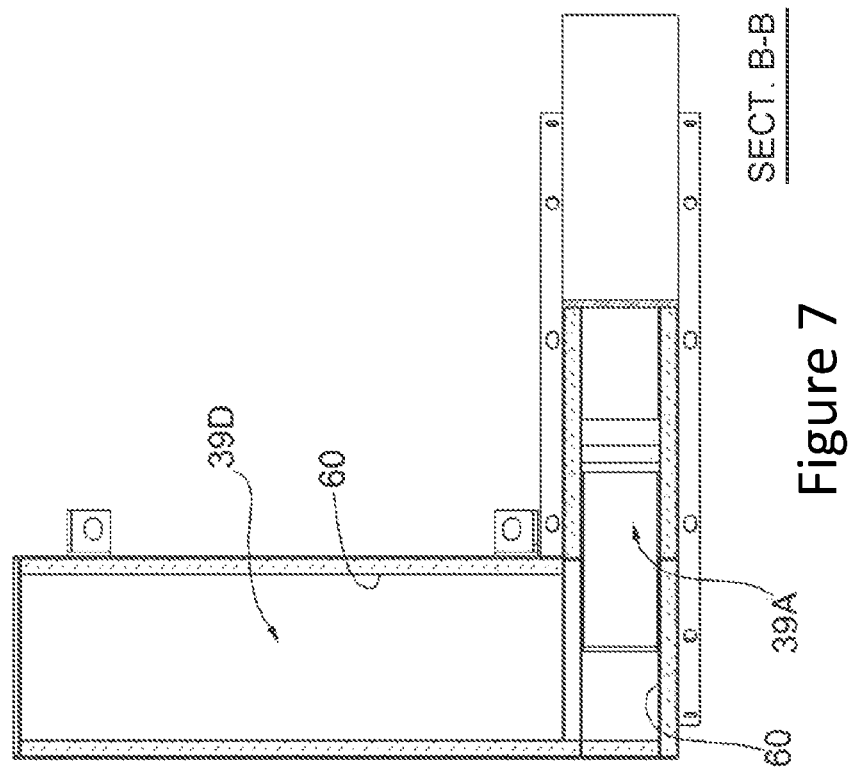
FIG. 7 shows a longitudinal section B-B of the silencer device of FIG. 5.
Figure 6:
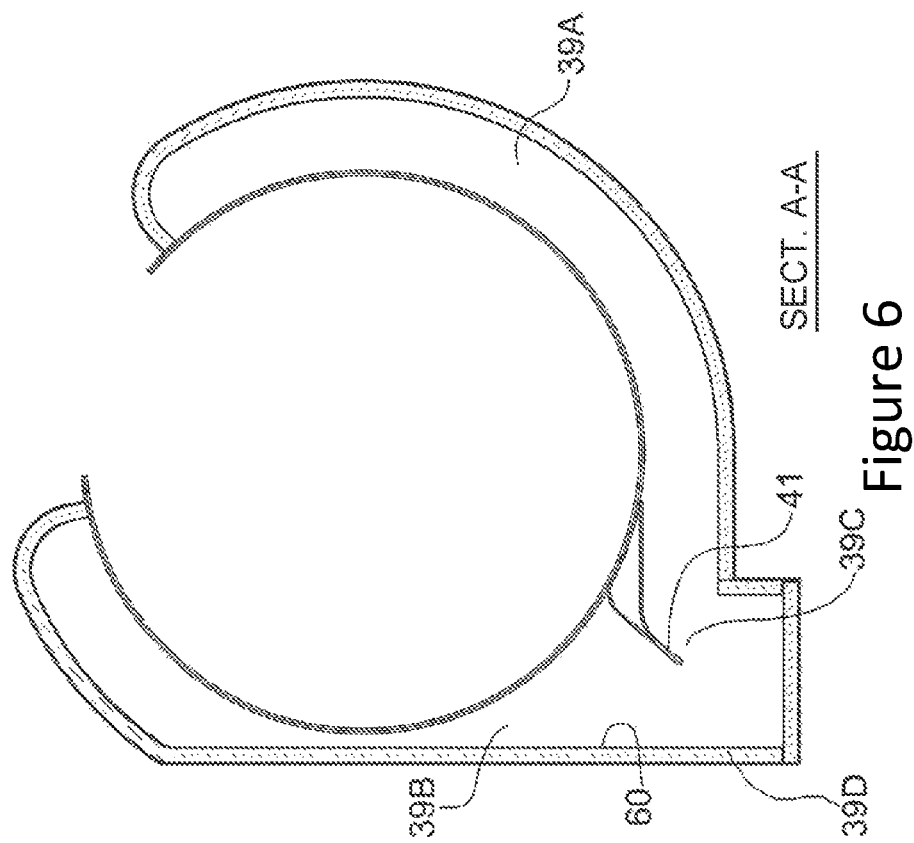
FIG. 6 shows a cross section A-A of the silencer device of FIG. 5.

Advantageously, though not necessarily, all or part of the channels 39A, 39B are coated, on the inside, with a properly protected layer 60 of sound absorbing material (FIGS. 5, 6, 7).

To sum up, the draining device 30 is provided with a silencer device 70 comprising the straight channel 39D and, if available, the layer 60 of sound absorbing material.

A further positive effect on the reduction of the noise of the system is provided by the scroll 300 consisting of the two separate arched channels 39A, 39B, where no stationary vortices are created.

The main advantage of the invention lies in the fact that, thanks to the innovative shapes and arrangements of the cooling air draining channels, there is a significant reduction in the sound emissions of the electric motor assembly for railway drive, with a relative improvement of the operators working conditions and of the passengers comfort.

A further advantage lies in the fact that, since the scroll is divided into two separate arched channels communicating with one another only in a common outlet area, there are no vortices on the inside thereof in both rotation directions (clockwise and counterclockwise) of the fan. This positively affects the reduction of power dissipation and the reduction of the noise of the system.

The invention claimed is:

1. An electric motor assembly for railway drive;
the motor assembly comprising:
    electric drive means;
    ventilation and cooling means for ventilating and cooling said electric drive means through cooling air; said ventilation and cooling means being fitted onto the shaft of said electric drive means; and
    draining means for draining the ventilation and cooling air flow used to ventilate and cool said electric drive means; said draining means being provided with silencer means for the cooling air flow;
the motor assembly being characterized in that said silencer means comprise at least one straight channel to reduce the turbulent flow into a substantially laminar flow of the ventilation and cooling air flowing out of said draining means;
and in that said draining means furthermore comprise, a scroll surrounding ventilation means, which comprises two separate arched channels; said arched channels communicating with one another, from the fluidic point of view, only in a common outlet area for the ventilation and cooling air; said scroll and said at least one straight channel being placed in series with respect to each other;
wherein said scroll comprises an inner shell, which is provided with a first series of upper openings and with a second series of lower openings.

2. Motor assembly, according to claim 1, characterized in that the longitudinal axis (X2) of said straight channel is parallel to the longitudinal axis (X1) of said electric drive means.

3. Motor assembly, according to claim 1, characterized in that said straight channel has a square or rectangular cross section.

4. Motor assembly, according to claim 1, characterized in that some openings of the first series of the upper openings and the second series of lower openings have a trapezoidal shape, whereas other openings of the first series of the upper openings and the second series of lower openings are shaped like a triangle.

5. Motor assembly, according to claim 1, characterized in that said inner shell is contained in an outer shell.

6. Motor assembly, according to claim 5, characterized in that said outer shell comprises an upper half-shell, which faces the upper openings, and a lower half-shell, which faces the lower openings.

7. Motor assembly, according to claim 6, characterized in that the outer wall of a first portion of said inner shell, the inner wall of the upper half-shell, a bottom wall and a front face form a first arched channel; and in that the outer wall of a second portion of said inner shell, the inner wall of the lower half-shell, a bottom wall and a front wall form a second arched channel.

8. Motor assembly, according to claim 7, characterized in that said common outlet area is provided with deflector means, which are designed to guide the two air flows flowing out of said arched channels.

9. Motor assembly, according to claim 1, characterized in that said straight channel and/or said arched channels is/are coated with at least one layer of sound absorbing material.

10. An electric motor assembly for railway drive;
the motor assembly comprising:
    electric drive means which comprises a shaft rotatable about its axis (X1);
    ventilation and cooling means for ventilating and cooling said electric drive means through cooling air; said ventilation and cooling means comprising a fan fitted onto the shaft; and
    draining means for draining a cooling air flow of the cooling air used to ventilate and cool said electric drive means; said draining means being provided with silencer means for the cooling air flow;
said silencer means comprises at least one straight channel to reduce the turbulent flow into a substantially laminar flow of the cooling air flowing out of said draining means;
said draining means furthermore comprising a shell surrounding said fan;
wherein said draining means further comprises two arched channels arranged peripherally relative to said axis (X1) and separated from each other by means of an interruption area, so as to directly communicate with one another, from a fluidic point of view, only in a common outlet area for the cooling air;
wherein said shell comprises a series of first openings to allow the cooling air flowing from said fan to one of said two arched channels, and a series of second openings, to allow the cooling air flowing from said fan to the other of said two arched channels;
said common outlet area being a mouth of said at least one straight channel so that said shell and said at least one straight channel are placed in series with respect to each other.

* * * * *